United States Patent

[11] 3,601,557

[72] Inventor Thomas M. Lennox
Mentor, Ohio

[21] Appl. No. 15,468
[22] Filed Mar. 2, 1970
[45] Patented Aug. 24, 1971

[73] Assignee Scanfax Systems Corporation
New York, N.Y.

[54] COUNTER FOR TAPE-RECORDING SYSTEM
9 Claims, 9 Drawing Figs.

[52] U.S. Cl. .......... 179/100.2 E, 179/100.2 Z, 235/92 SB
[51] Int. Cl. .......... G11b 5/86, G06f 15/46
[50] Field of Search .......... 179/100.2 Z, 100.2 E, 100.2 MI; 274/3, 4 E, 4 C, 10 E; 235/92 PK, 92 PD, 92 SB

[56] References Cited

UNITED STATES PATENTS

| | | | |
|---|---|---|---|
| 2,908,767 | 10/1959 | Fritzinger | 179/100.2 E |
| 3,165,321 | 1/6965 | Osborne | 274/10 E |

*Primary Examiner*—Bernard Konick
*Assistant Examiner*—Jay P. Lucas
*Attorney*—Amster & Rothstein

ABSTRACT: A counter system for use in a tape recorder is described as including switching and circuit means for initiating a single pulse count upon angularization of a cassette-receiving module with respect to a system operational panel after a recording operation has been performed with the cassette in that module.

INVENTOR.
THOMAS M. LENNOX
BY Amster & Rothstein
ATTORNEYS

INVENTOR.
THOMAS M. LENNOX
BY Amster & Rothstein
ATTORNEYS

COUNTER FOR TAPE-RECORDING SYSTEM

This invention relates primarily to tape-recording systems and more particularly to counter circuits and mechanisms for use therewith in providing an output representative of the number of recorded reproductions that are produced using said systems.

The present invention is particularly useful with an apparatus and method for the preparation and transmission of audio information from an origin location to a first remote location (normally a library or other convenient depository), and then, in multiple copies of such audio information, the dissemination thereof to a plurality of further remote locations. To more particularly describe this method of information flow, the contemplated origin location is a recording studio with the necessary recording equipment for reproducing audio information on master tapes. The audio information which is recorded may be in the form of a lecturer reading from a written manuscript, or the like. Following the recording of individual master tapes at the recording studio, the tapes are packaged in protective cassettes and placed in a convenient depository (such as a library) to reproduce the information of the master tapes onto so-called "slave" tapes. A recording system capable of accommodating at least one, and preferably more "slave" tapes in cassettes is provided for recording the program of a selected master tape at the depository (library). Such a system enables wide dissemination of audio information. The "slave" recordings are produced in cassettes and may then be reproduced and played back at further remote locations.

The invention, as described herein, is particularly useful in a recording system for producing multiple "slave" tape recordings from a master at the library or remote location. It is convenient, during such production of "slave" tape recordings, that means be provided for determining the number of such "slvae" tape recordings that are produced. In this way, the supplier of such equipment at the library and remote locations is then able to determine the use that has been made of his equipment and, more importantly, has a convenient way to acquire profit from such use. Furthermore, it is also important that any such counting system produce a count only after a "slave" recording has been reproduced from a master tape and only at the completion of such reproduction. Also, it is necessary that the counting mechanism be actuable after a "slave" reproduction has been made even if the main power source for the recorder has been shut off.

Accordingly, a primary object of the present invention is to provide an efficient and reliable means by which the number of "slave" tape recordings reproduced from masters is indicated.

A further object of the present invention is to provide a counting mechanism and circuit which is actuable in cooperation with an indication of the completion of predetermined sequences in a tape-recording system.

These and other objects of the present invention are accomplished in accordance with one illustrative embodiment of the present invention by a mechanism and circuit for indicating the number of "slave" recordings that have been reproduced from master tapes. The mechanism and circuit are used in combination with a "slave" cassette-receiving module which includes a switch for triggering the counter circuit relay coil and charging a capacitor for the particular "slave" recording, whose discharge provides the pulse for the pulse counter in the circuit. The cassette-receiving module for "slave" recordings is constructed such that its operational position is in contact with and parallel to a horizontal operational panel for the recording system. Also, its loading and unloading position is angularized with respect to said operational panel. The switch for the counter circuit is so located and arranged that it is closed and thereby charges the counter circuit capacitor only when the module is within a few degrees of its parallel operational position. Angularization of the module at any time after the operational period produces an open position for the switch thereby allowing the capacitors to discharge through the pulse counter. A variety of other mechanisms and means are contemplated for triggering the operation of a counter so that a single count for the counter is provided in response to the removal of a cassette from its operational, active, engaged position in the system. Such removal of a "slave" cassette from its operational position does not necessarily require angularization of the module but it is within the teaching of the present invention to trigger a counting circuit by merely removing the cassette from any predetermined operational active, engaged position. The main feature of any mechanism and circuit useful in the present invention is the provision of a count output to indicate that a "slave" recording has been made, and that the count is provided only after that recording. As many relays and capacitors as there are "slave" recordings that may be reproduced at any one time are located in parallel relationship in the circuit with any one set of relay and capacitor being able to pulse the counter to indicate a single count.

The above brief description as well as further objects, features and advantages of the present invention will be more fully appreciated by reference to the following detailed description of the preferred, but nonetheless illustrative embodiment when taken in conjunction with the accompanying drawings, wherein.

Figures 1, 2, 3, 4:
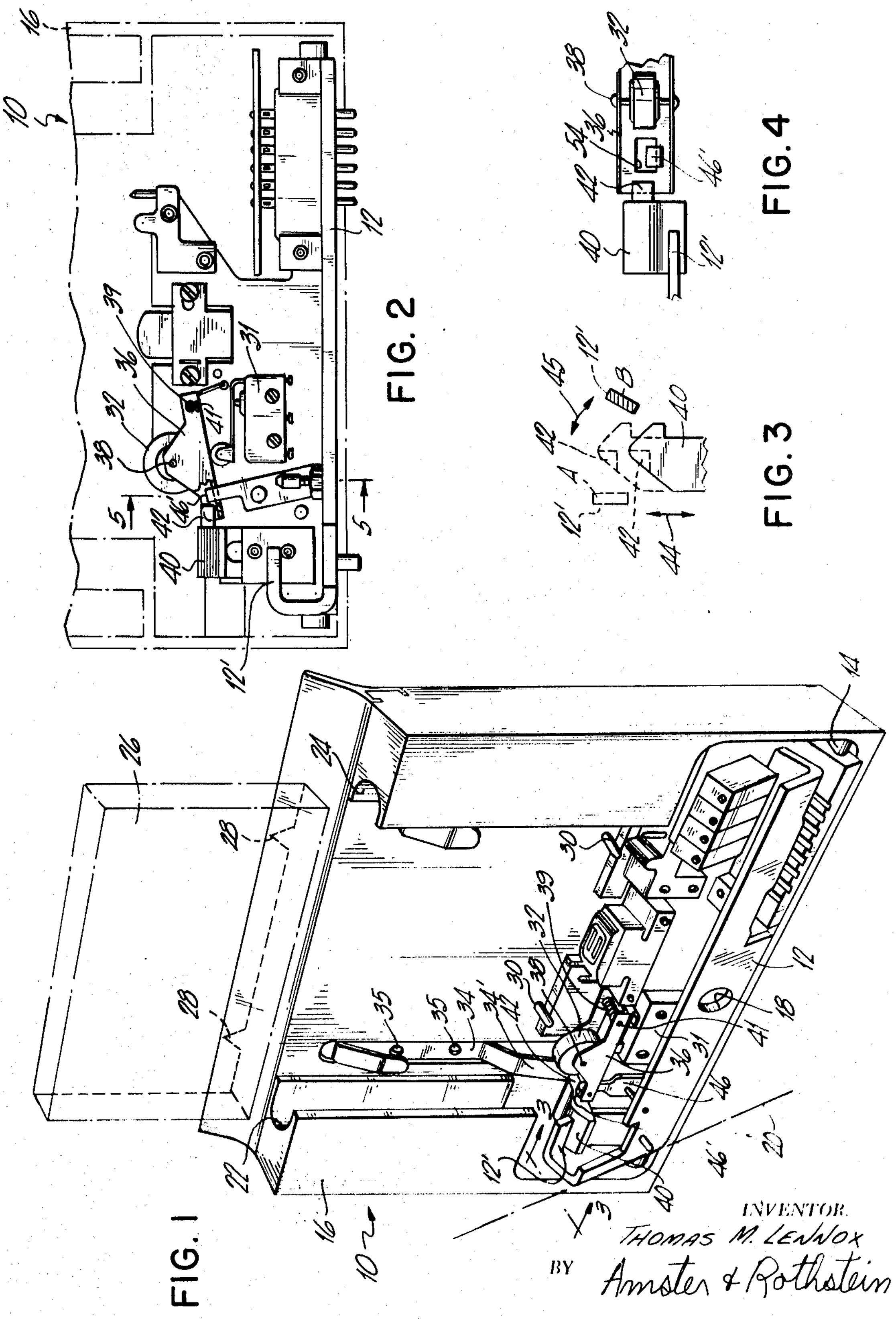
FIG. 1 is a front perspective view of a "slave" cassette-receiving module and a mechanism therein, including a counter switch, for actuating and operating a counter circuit as described herein.
FIG. 2 is a partial front view of the mechanism and counter switch in the module of FIG. 1.
FIG. 3 is a partial sectional view of a part of the mechanism of FIG. 1, taken along the line 3—3 of FIG. 1 showing a linear cam and cam driver useful therewith.
FIG. 4 is a top, partial view of the part of the mechanism shown in FIG. 3.
Figure 9:
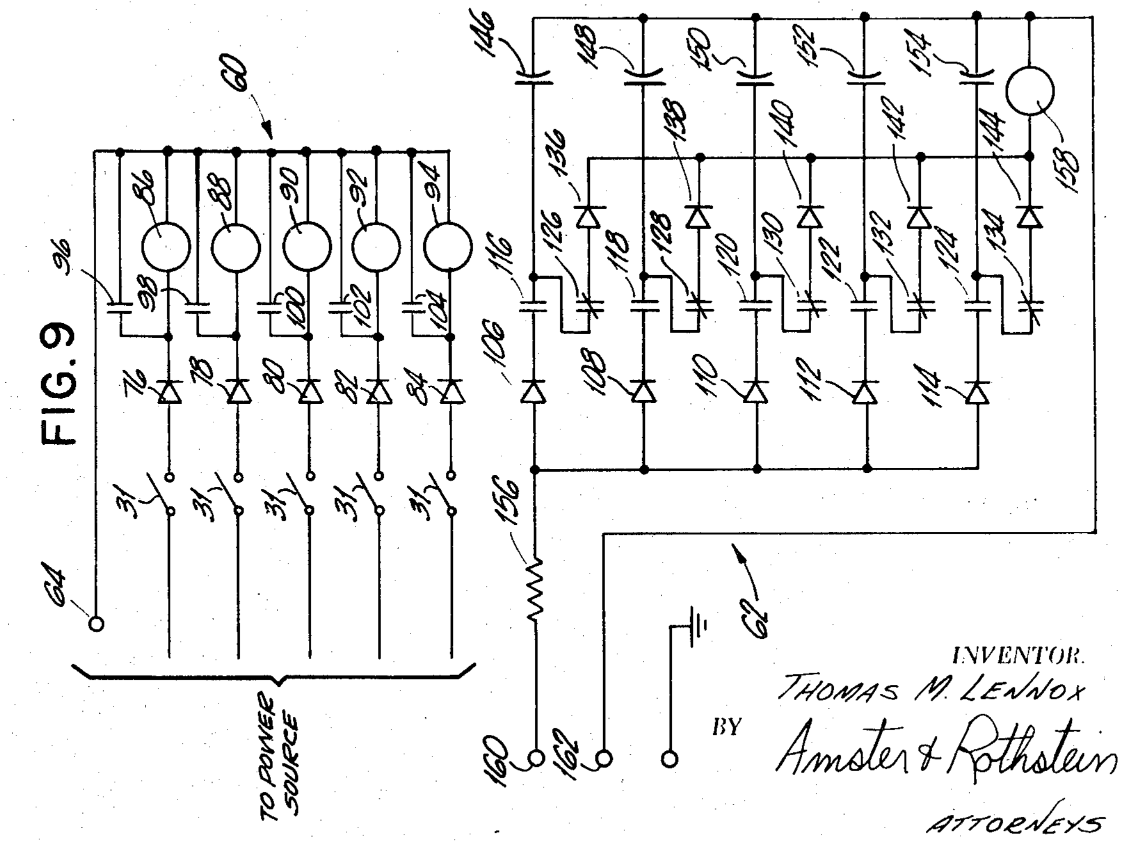

FIGS. 5 through 8 are sectional views of the cassette-receiving module and its mechanism taken along the line 5—5 of FIG. 2, showing the various positions attainable by the module with the cassette loaded and unloaded thereto; and FIG. 9 is a schematic representation of a counter circuit useful in cooperation with the module, cassette and mechanism as described herein according to the present invention.

Referring specifically to the drawings, and in particular FIG. 1, a cassette-receiving module, generally designated 10, is shown in a rotated position relative to positions it may normally attain for the purposes of clarity. The cassette-receiving module is supported on its base 12 by means of shaft 14, which is affixed to the base 12 and rotatable relative to the module body 16. The base 12, during operation, is affixed by attachment means (not shown) to the system operational panel represented by the broken line 20. Of course, as stated previously, both the base 12 and the operational panel 20 are intended to be disposed horizontally and parallel to each other during operation of the system. The opening 18 defined by the base 12 is for reception of an idler shaft (not shown).

The module body 16 defines a receptacle including channels 22, 24 for insertion of the cassette 26 represented by ghost lines in FIG. 1. "Slave" tape cassettes, as distinguished from master cassettes, are constructed to define notches 28 for mating with locating pins 30 extending from the module body 16 in its receptacle. This mating relationship blocks master tape cassettes from attaining a fully loaded position and conversely, allows such a position with respect to "slave" cassettes. Also, such construction prevents insertion of inverted cassettes. As will be seen from the following detailed description of a mechanism and counter circuit according to the present invention, the fully loaded position is necessary to provide actuation of a counter circuit and mechanism as described herein.

Referring to FIGS. 1 through 8 of the drawings, a mechanism useful in the present invention is shown to include, for controlling the actuating of counter switch 31, a pinch roller 32, and a flat spring 34 affixed by attachment means 35 to the nodule receptacle. The flat spring 34 is constructed and shaped to include detent 34', which at various times during the mechanism operation, as described herein, contacts and holds pinch roller channel 36 in a midposition. The pinch roller channel 36 rotatably supports the pinch roller 32 by means of shaft 38, which is fixed with respect to the channel 36 and rotatable relative to the pinch roller 32.

It may be seen that the pinch roller channel 36, and therefore the pinch roller, is attached to the body 16 of the cassette-receiving module (pivotally by means of shaft 41) and rotates therewith relative to the base 12 and the operational panel 20.

Further, the mechanism includes a linear cam 40 having a cam extension 42 proximate the pinch roller channel 36. The linear cam 40 moves in the direction of arrows 44 of FIG. 3 such that it follows a path parallel to the extension of channel 22 of the receptacle shown in FIG. 1. Such motion is produced by a relative motion of cam driver 12' (which is a part of the base 12) with respect to the cam 40. Under control of the cam driver 12' and the linear cam 40, the pinch roller channel 36, and therefore the pinch roller 32, are selectively caused to assume a fully retracted position relative to the tape in the tape cassette 26 during loading and before operation (see FIGS. 6 and 7). This fully retracted position can also be described as the lowermost position in the receptacle of the module body 16. With all parts of the mechanism disengaged from the channel 36, the pinch roller assumes a normal or tape-contacting position (FIG. 8) under the action of spring 39 on the shaft 41 about which the pinch roller channel 36 rotates.

The mechanism also includes a latch 46 to hold the pinch roller channel 36 in its fully retracted position. The latch 46 is attached to a mechanism mount 50 by attachment means 47, the motion of the latch 46 being structurally limited both by the mechanism mount 50 and the head 48 of a motion-limiting screw. The motion of the latch 46 is further confined and controlled by pin 52 which extends from the base 12 of the cassette-receiving module. The latch 46 may be formed from a leaf spring material (not shown) or may be backed by spring member 49 to bias the latch 46 outward from the mount 50. The latch 46 includes a latch shoulder 46' which is insertable to an opening 54 defined by the pinch roller channel 36. When the cassette-receiving module body 16 is in its horizontal and parallel deangularized position (or within a few degrees thereof) with respect to the operational panel 20, the pin 52 holds the latch 46 against the mechanism mount 50 and prevents it from entering the opening 54. However, in the angularized position of the cassette-receiving module body 16 with respect to the operational panel 20, the latch shoulder 46' enters the opening 54 and locks the pinch roller channel 36 in its fully retracted position. Such locking action by the latch shoulder 46', and its insertion to the opening 54, is accomplished when the pinch roller channel 36 is moved into its fully retracted position under the influence of the cam extension 42.

In cooperation with the mechanism as described above, a counter circuit (FIG. 9) operates to satisfy the objectives of the present invention. The same electrical power that drives the record operation for "slave" cassettes also drives the circuit. Therefore, the counter circuit is inoperative until after a record operation is initiated. The counter circuit includes two parts 60, 62, the first of which is connected to a plurality of "-slave" counter switches 31 (FIG. 9), one for each "slave" module. Of course, only one "slave" module and counter switch 31 are shown in the other drawings. The first circuit part 60 further includes relay coils, 86 through 94, which are normally inactivated so that no current flows through the counter circuit. The relay coils are 24 volt DC. This circuit part 60 also includes rectifiers, 76 through 84, for converting the AC source to DC to operate the relay coils and to keep capacitors, 96 through 104, in a charged condition. The capacitors, 96 through 104, smooth out the pulsating DC obtained with rectifiers, 76 through 84. The relay coils have single-pole, double-throw contacts, 116 through 134. The second circuit part 62 includes rectifiers, 106 through 114, for converting AC to DC for charging the capacitors, 146 through 154, normally open relay contacts, 116 through 124, normally closed relay contacts, 126 through 134, steering diodes, 136 through 144, and capacitors, 146 through 154. The second circuit part 62 further includes resistor 156 and pulse counter 158. The rectifiers for the counter circuit (106 through 114, 136 through 144) may be General Electric, GE 5060 rectifiers for use with a 270 ohm resistor 156, 20 microfarad per 250 volt capacitors, 146 through 154, and 120 volts across the connectors 160, 162 from the drive motors.

The counter circuit operates in cooperation with the mechanism as described above such that depression of the counter switch plunger 31' (when the pinch roller channel 36 is in mid or fully retracted position) opens the switch 31 and prevents current from flowing through the counter circuit. Also with the counter switch plunger 31' in depressed position, the normally open relay contacts, 116 through 124, are in the open position and normally closed relay contacts, 126 through 134, are in their normally closed position to thereby inactivate the second circuit part 62. When the plunger 31' is released, the relay coils, 86 through 94, are activated, such activation being enabled by the counter switch 31 attaining its normally closed position. In such a situation, relay contacts 116 through 124 will be closed while relay contacts, 126 through 134 are opened, thereby charging the capacitors, 146 through 154. Subsequent depression of the plunger 31' will open the relay contacts, 116 through 124, and close the relay contacts 126 through 134, thereby enabling discharge of capacitors 146 through 154 to the relay contacts 126 through 134 and to rectifiers, 136 through 144. The discharge then flows to produce a pulse through the pulse counter 158 indicating a single reproduction by the tape-recording system.

Figures 5, 6, 7, 8:
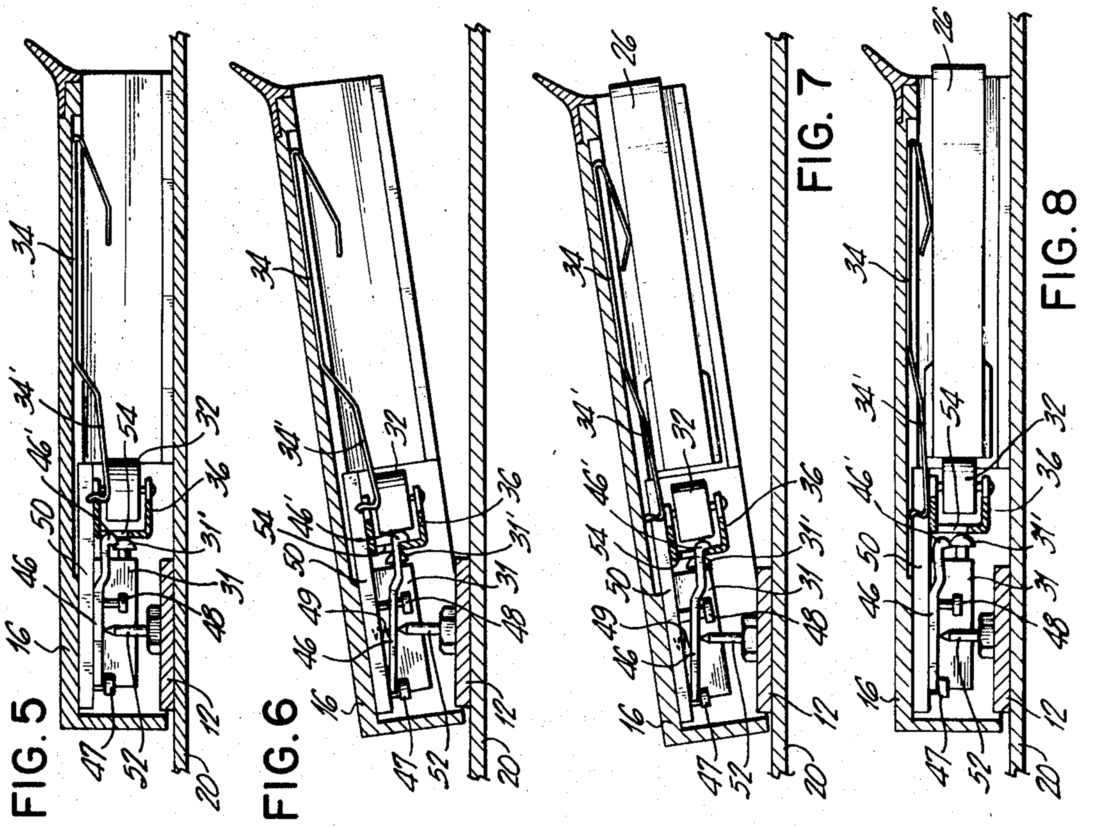

With the mechanism and circuit according to the present invention having been described above, for the purposes of clarity, a full sequence of operations will now be described with reference to all of the figures of the drawings, assuming that the single cassette-receiving module 10 shown in the drawings is connected through its limit switch 31 to relay coil 90 in the first circuit part 60 in FIG. 9. The first position and condition of the mechanism and cassette-receiving module body 16 is represented by FIG. 5 and includes the cassette-receiving module body 16 in a parallel condition with respect to the operational panel 20. It may be seen from FIG. 5 that the module receptacle is empty and therefore the detent 34' of flat spring 34 has assumed a blocking position with respect to the pinch roller channel 36 such that the channel is in a midposition. Such position of the pinch roller channel 36 provides a depressed position for the counter switch plunger 31'. The counter switch 31 is therefore in an open position. Also shown in FIG. 5, the latch 46 is held against the mechanism mount 50 by pin 52 attached to the base 12 of the cassette-receiving module, so that the latch shoulder 46' is thereby prevented from entering the opening 54 in the pinch roller channel 36.

In FIG. 6 the next step of the loading sequence is shown with the cassette-receiving module body 16 having been lifted to an angular position in relation to the operational panel 20. Before loading of the cassette 26, the mechanism of the present invention has assumed a position such that the latch shoulder 46' has entered the opening 54 of the pinch roller channel 36. Such entrance is enabled by the latch having been lifted from pin 52 through the angularization of the cassette-receiving module body 16. Furthermore, such entrance has been further facilitated by the motion of the linear cam driver 12' (FIG. 3) in moving from position A to position B (relative to the cam 40. Actually, the cam moves back and forth in directions 45, shown in FIG. 3, as the module is angularized and deangularized) during angularization of the module body 16. Such relative motion by the cam driver 12' pushes the linear cam 40 downward so that the cam extension 42 retracts the pinch roller channel 36 to its lowermost position in the receptacle of the module body 16, thereby enabling the entry of latch shoulder 46' to the opening 54. The latch shoulder 46' then assumes the locking function to hold the pinch roller channel 36 in that fully retracted position. In the FIG. 6 position it may be seen that the counter switch plunger 31' is still in the depressed condition thereby holding the counter switch 31 in an open condition.

Referring to FIG. 7, the cassette 26 is inserted to the receptacle of the cassette-receiving module body 16, and since it is a "slave" cassette, its notches 28 will fit over locating pins 30 allowing it to bottom in the receptacle. Upon moving into the receptacle, the cassette 26 depresses the detent 34' of the flat spring 34 so that it is no longer in blocking relationship to the pinch roller channel 36.

In all of the positions and conditions shown in FIGS. 5 through 7 inclusive, the counter switch plunger 31' is depressed to hold the counter switch 31 open so that the circuit for that "slave" cassette-receiving module has the following conditions: current is not flowing through the counter circuit, relay coil 90 is in an inactivated condition and relay contact 120 is in its normally open condition.

FIG. 8 represents the operational position and condition of the mechanism and circuit with module body 16 deangularized in a parallel and horizontal position with respect to the operational panel 20. The deangularization has once more caused the pin 52 to depress the latch 46 so that the latch shoulder 46' is removed from the opening 54 in the pinch roller channel 36. Since neither the latch shoulder 46' nor the detent 34' (pushed out of the way in the FIG. 7 position by the cassette 26) is holding the channel 36 in retracted position, the pinch roller channel and the pinch roller have moved to recording relationship with respect to the tape in the cassette 26. The removal of latch shoulder 46' from opening 54 in going from the position of FIG. 7 to FIG. 8 is facilitated by relative motion of the cam driver 12' from position B to position A (FIG. 3), which motion depressed the pinch roller channel 36 for a time just long enough for removal of latch shoulder 46' from opening 54. For the first time, as shown in FIG. 8, the counter switch plunger 31' has been released from its depressed position thereby closing the counter switch 31. The closing of counter switch 31 activates relay coil 90 so that AC current flows through rectifier 110, is converted to DC and flows through the closed relay contact 120 to charge the capacitor 150. Such current flow is initiated by activation of the power source.

After recording, the module body 16 and the mechanism assume an angularized position with respect to the operational panel 20. During the angularization, the cam drive 12' has again moved (relative to the cam 40) from position A to position B (FIG. 3). This action, along with the release of pressure by pin 52 on latch 46 has again facilitated entry of the latch shoulder 46' to the opening 54. Therefore, the pinch roller channel 36 is again locked in its fully retracted position. Such fully retracted position again depresses the counter switch plunger 31' and opens the counter switch 31. This action of the counter switch (even with the power source "off") returns relay contact 120 to its normally open position and causes relay contact 130 to return to its normally closed position. The capacitor 150 is thereby caused to discharge current through a path including the relay contact 130 and steering diode 140 so that a pulse goes through the coils of pulse counter 158. The other steering diodes 136, 138, 142, 144 prevent backup of this pulse through the other paths. Such action and circuit operation thereby indicate a count of one showing that a single "slave" recording has been made from a master on the tape-recording equipment as described.

If more than one cassette-receiving module body is loaded at this point (and power is "off"), a time separation of pulses to the counter 158 is insured by varying the values of capacitors, 96 through 104, between 5 microfarads and 50 microfarads. In this way, if three modules are loaded and power is shut off before unloading of the cassettes, three separate and recognizable pulses will be obtained for the counter 158.

Since up to five "slave" recordings may be made with the counter circuit as shown and properly counted, it should be understood that the circuit is capable of counting all five recordings individually. Each time an operation as described above occurs, a pulse will be caused to flow through the coils of pulse counter 158 to thereby produce a count of "one." Of course, the hand movement involved in angularizing a "slave" cassette-receiving module requires that, almost invariably, only one angularization will take place in a single instance, even in a recording system capable of accommodating as many as five "slave" recordings, so the "one" count accurately indicates that only one "slave" recording has been made. It should also be understood that the circuit as shown may be easily expanded if the recording system is desired to accommodate more than the five "slave" recordings discussed above.

In accordance with the above description, a mechanism and cooperating circuit and construction has been described to insure a count output for each "slave" recording produced in a tap-recording system as described.

What is claimed is:

1. A counting mechanism and circuit for use in a tape recorder reproduction system for tape cassettes including at least one "slave" tape module for receiving a "slave" cassette having a "slave" tape therein and for recording on said tape audio information, means defining an active, engaged position for said cassette in which position audio information is reproduced on said tape, switching means responsive to the removal of said cassette from said active, engaged position and electrical counting means in circuit connection with said switching means to count the number of times a cassette is removed from said active, engaged position which indicates the completion of said reproduction.

2. The invention according to claim 1 wherein said system includes a system operational panel and said electrical counting means comprises a pulse counter, a counter circuit connected to said pulse counter, said counter circuit including a capacitor and a relay having first and second relay contacts, and wherein said switching means provides charging of said capacitor through said first relay contact upon attainment by said cassette of said active, engaged position and for enabling discharge of said capacitor through said second relay contact and said pulse counter upon removal of said cassette from said active, engaged position.

3. The invention according to claim 2 wherein said module is rotatably attached to said system operational panel such that it is capable of attaining first and second positions with respect to said panel and both loaded and unloaded conditions with respect to said tape cassette, said active, engaged position including said loaded condition and said first position of said module.

4. The invention according to claim 2 wherein said tape recorder reproduction system is useful for reproducing the recording of a single tape onto a plurality of other tapes in tape cassettes and a plurality of counter circuits are provided, one for each of said tape cassettes, said plurality of circuits being arranged in parallel relationship for providing an input to a single pulse counter.

5. The invention according to claim 2 wherein the input to said first relay contact is an AC signal and means are provided in the input to said first relay contact for converting said AC to DC.

6. The invention according to claim 5 wherein steering means are provided in said counter circuit between said second relay contact and said pulse counter.

7. A counting mechanism and circuit for use in a tape recorder reproduction system including a tape cassette, a system operational panel, a cassette-receiving module rotatably attached to said panel and adapted to attain first and second positions with respect to said panel and loaded and unloaded conditions with respect to said tape cassette, comprising a pulse counter, a counter switch, said counter switch attaining a first switching condition in response to said first position and said loaded condition of said module, and a second switching condition in response to said second position, and circuit means for providing a pulse to said pulse counter upon attainment of said second switching condition after attainment of said first switching condition.

8. The invention according to claim 7 wherein said circuit means comprises a relay having first and second relay contacts and a capacitor, the attainment by said counter switch of said first switching condition charging said capacitor by the closure of said first relay contact and the opening of said second relay contact, the attainment by said counter switch of said second switching condition discharging said capacitor to said pulse counter by closure of said second relay contact and the opening of said first relay contact.

9. The invention according to claim 8 wherein said first relay contact is a normally open contact and said second relay contact is a normally closed contact.